May 11, 1948. W. T. WHITE ET AL 2,441,175
SYSTEM FOR REPRODUCING ANGULAR MOTION AT A DISTANCE
Filed July 30, 1943
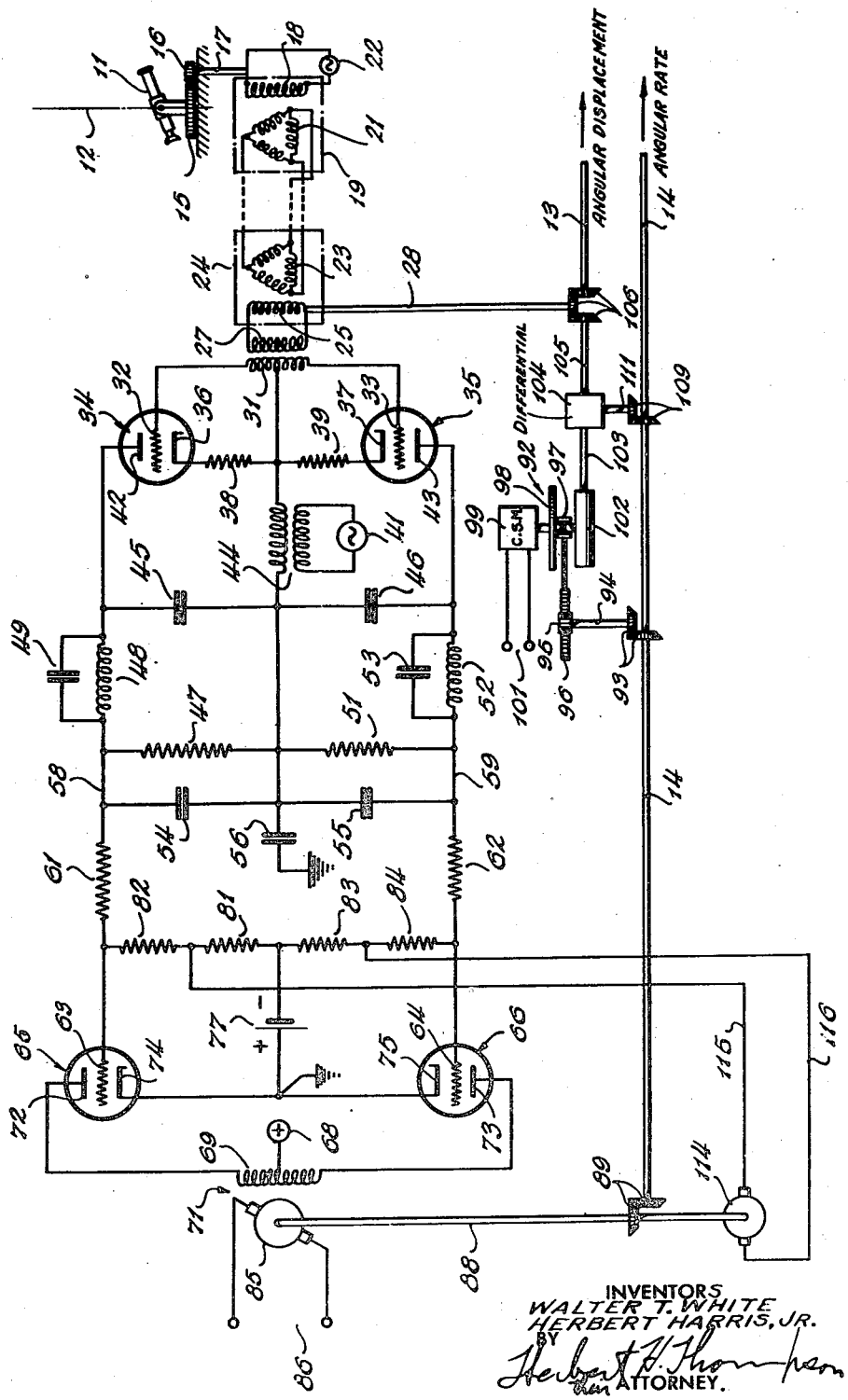
INVENTORS
WALTER T. WHITE
HERBERT HARRIS, JR.
BY
ATTORNEY Patented May 11, 1948

2,441,175

UNITED STATES PATENT OFFICE 2,441,175

SYSTEM FOR REPRODUCING ANGULAR MOTION AT A DISTANCE

Walter T. White, Hempstead, and Herbert Harris, Jr., Cedarhurst, N. Y., assignors to The Sperry Corporation, a corporation of Delaware Application July 30, 1943, Serial No. 496,733

6 Claims. (Cl. 318—30)

This invention relates generally to a remote control system for synchronizing the movements of a controlled member with a control member. It particularly concerns a system in which means are provided for determining the rate of movement of the members and also to eliminate speed lag between the two members.

Many arrangements have been proposed for remotely controlling movements of a controlled member synchronously with a control member. In order to improve these controls, differentiating or rate circuits have been suggested to anticipate changes in movements of the control member. However, it usually is necessary to have a slight difference between the positions of the control and controlled members in order to produce an error-signal that actuates the control system. For example, the control member is rotating at a constant velocity, the controlled member may rotate at the same velocity, but will lag slightly to produce a sufficient error signal. The present invention eliminates this lag by using an integrating device to drive the controlled member. In this manner, the error signal may be reduced to zero, and the controlled member will move at the same velocity and synchronously with the control member, the lag being entirely eliminated.

In addition, it is sometimes desirable to determine the rate of movement of one of the members. Since the members are moved synchronously, their rates of movement are identical. An illustration of the use of such rates of movement is found in fire control systems wherein a sight is rotated about an axis to track a target. The position of the sight determines the observed position of the target. If the rate of rotation of the sight is known, it is possible to predict the future position of the target in order to direct a projectile toward it.

Various tracking devices have been proposed to determine the rate of rotation of the sight. In the case of a remote control system, it is, of course, necessary to transmit the rate as well as the position to a remote point. The present invention provides a measure of the rate of a remote controlled member that is moved synchronously with the sight. In this way a separate transmission system for the rate is eliminated.

One object of the invention is to provide a remote control system in which the rate of movement of the controlled member is determined.

Another object of the invention is to provide a remote control system with an integrating device for positioning the controlled member to reduce speed lag between the two members.

A further object of the invention is to provide a remote control system with derivative, proportional and integral stabilization controls.

A still further object of the invention is to provide a remote control system in which an error signal corresponding to the displacement of two members is converted to a measure of the rate of movement of said member.

Other objects and advantages will become apparent from the following specification taken in connection with the accompanying drawing.

The drawing shows a schematic diagram of a remote control system embodying the invention.

The system shown in the drawing includes a sighting device that is used to track movements of a mobile target and provides, at a remote point, a measure of the position of the sighting device as well as the rate of its movement.

Sighting device 11 is rotatably mounted for movement about a vertical axis 12, to follow movements of a mobile object such as a moving target. The remote control system including the present invention operates to position an output shaft 13 synchronously with movements of the sight about the axis 12 and to position a rate shaft 14 in accordance with the rate of movement of the sight 11 about the axis 12.

As the sight is rotated it drives through a pinion 15 and a gear 16 to rotate a shaft 17 that positions a rotor winding 18 of a suitable transmitter 19 such as an "Autosyn," "Selsyn" or "Telegon," having a stator winding 21. Rotor winding 18 is energized from a suitable alternating voltage source 22, whereby a voltage is induced in the stator winding 21 and transmitted to stator winding 23 of a receiver 24 in a conventional manner to produce a signal in rotor winding 25 of the receiver 24 according to its angular position relative to that of rotor winding 18 in the transmitter 19.

The transmission system may be of any suitable type to apply a signal to primary winding 27 of an input transformer corresponding to the angular displacement of shaft 28 which is connected to the rotor 25 relative to the position shaft 17 which is connected to the rotor 18. In the transmission system shown in the drawing, the primary winding 27 has a phase and magnitude corresponding to the direction and amount of the displacement of the controlled shaft 28 relative to control shaft 17.

A corresponding signal voltage is induced in secondary winding 31 and applied in phase opposition to grids 32 and 33 of phase-detecting tubes 34 and 35 respectviely. Cathodes 36 and 37 of the tubes 34 and 35 are connected through suitable biasing resistors 38 and 39 to the midpoint of the secondary winding 31.

An alternating voltage of a source 41 is applied in like phase to plates 42 and 43 of the two tubes as by a suitable coupling transformer 44 and condensers 45 and 46 in the plate circuits of the two tubes.

The circuit of plate 42 of the tube 34 includes a load resistor 47 and a filter circuit including a choke 48 and condenser 49. Similarly the circuit of plate 43 includes a load resistor 51 and a filter circuit including a choke 52 and condenser 53 connecting the parallel. Suitable condensers 54 and 55 are connected across the load resistors 47 and 51 and are connected to ground through a condenser 56.

Phase-detecting tubes operate in a conventional manner such that when no signal is applied to the grids 32 and 33, the currents through the two tubes are equal and the voltages developed across load resistors 47 and 51 are equal and balance each other. When a signal, corresponding in phase and magnitude to the direction and amount of displacement of the control shaft 28 relative to the controlled shaft 17, is applied to the grids 32 and 33, more current passes through one of the phase-detecting tubes and less current passes through the other. A larger voltage is developed across one of the resistors 47 or 51 depending upon the phase of the signal relative to the source 41. Only the direct current component of the current through the tubes passes through resistors 47 and 51 because the alternating current components are by-passed by condensers 45 and 46 and/or smoothed by the filter circuits connected in series with the resistors.

The voltage across the two load resistors 47 and 51 as measured between leads 58 and 59 thus has a polarity and magnitude corresponding to the direction and amount of displacement of the controlled shaft 28 relative to the control shaft 17.

This voltage is supplied through resistors 61 and 62 to grids 63 and 64 of amplifying tubes 65 and 66. A positive potential from a suitable source 68 is supplied through opposite halves of a field winding 69 for a servo motor 71 to plates 72 and 73 of the tubes 65 and 66 respectively. Cathodes 74 and 75 are connected to ground. Suitable bias for the grids 63 and 64 is provided by a battery 77 having its positive side connected to the cathodes 74 and 75, and its negative side connected through grid resistors 81 and 82 to the grid 63 and grid resistors 83 and 84 to the grid 64.

When the voltages applied to grids 63 and 64 are equal, the currents drawn by the two tubes are equal and the currents through the opposite halves of the field winding 69 are equal, whereby armature 85, which is energized by a suitable electrical source 86 remains stationary. When the controlled shaft 28 is displaced relative to the control shaft 17 a voltage corresponding in polarity and direction to the direction and magnitude of the displacement is supplied through leads 58 and 59 to the grids 63 and 64 whereupon one of the tubes draws more current and hence one-half of the winding 69 creates a greater field than the other. This results in armature 85 being rotated in a direction by a torque dependent upon the error signal due to the relative displacement of the shafts 28 and 17.

The armature 85 drives through shaft 88 and gearing 89 to rotate the rate shaft 14 which is to be positioned in accordance with the rate of rotation of the controlled shaft 28. Since the controlled shaft 28 is to be rotated synchronously with the control shaft 17, the position of the rate shaft 14 will correspond to the rate of movement of the control shaft 17.

The rate shaft 14 actuates an integrating device such as variable speed drive 92 to position the controlled shaft 28. To accomplish this the rate shaft 14 drives through gearing 93 and shaft 94 to rotate pinion 95 which meshes with a rack 96 to translate ball-carriage 97 of the variable speed drive 92. Disc 98 of variable speed drive 92 is rotated by a constant speed motor 99 that is energized by a suitable electrical source 101.

Output cylinder 102 of the variable speed device is driven at a speed dependent upon the displacement of the ball-carriage 97 from its central position. The cylinder 102 rotates a shaft 103 forming one input of a differential 104, the output of which rotates shaft 105 that drives through suitable gearing 106 to rotate the controlled shaft 28 and output shaft 13 synchronously with the control shaft 17.

When the control shaft 17 is rotating, the receiver 24 generates an error signal when rotors 18 and 25 are relatively displaced, which controls the direction and speed of rotation of the motor 71. The motor 71 adjusts the ball-carriage 97 to a position at which controlled shaft 28 is rotated synchronously with the control shaft 17 and the rotor windings associated with these shafts are in phase, and under these conditions the error signal disappears, assuming shaft 17 is driven at constant speed, and motor 71 then stops. Since the controlled shaft 28 is then rotating synchronously with the control shaft 17, the ball-carriage 97 and the shaft 14 are necessarily displaced an amount corresponding to the rate of rotation of the shafts 28 and 17. When this condition is reached, the error signal is reduced to zero and the motor 71 remains stationary. In this manner shaft 13 is continuously positioned in accordance with the position of the shaft 17 when no error signal exists and thus continuously represents the angular displacement of the sight 11 about the axis 12. Since the speed of the shaft 13 is controlled by the position of the rate shaft 14, the position of the shaft 14 represents the rate of rotation of the sight 11 about the axis 12.

In the portion of the system thus far described, the only repeat back from the motor 71 mentioned is that supplied by the output of the integrating device. This repeat back corresponds to the integral of the output of the motor.

In order to provide stability for the system, an additional repeat back proportional to the output of motor 71 is fed back into the system. This is accomplished by driving gearing 109 from the rate shaft 14 to rotate shaft 111 forming a second input of the differential 104 whereupon the displacement of the controlled shafts 13 and 28 corresponds to the displacement of the motor 71 as well as the integral thereof. This does not affect the displacement and rate data determined by shafts 13 and 14. The shaft 13 is rotated together with the controlled shaft 28 synchronously with the control shaft 17. The rate shaft 14 is positioned according to the rate of rotation of the shafts 28 and 17.

In addition to the proportional and integral control of the system, additional stabilization may be provided by also controlling the system according to the derivative of the output of motor 71. For this purpose a derivative device such as permanent magnet-generator 114 is rotated by the shaft 88 from the motor 71. The generator produces a voltage dependent upon the speed, which is the derivative of the output of the motor 71. The voltage of the permanent magnet-generator 114 is supplied by leads 115 and 116 across grid resistors 81 and 83 to the grids 63 and 64 of the amplifying tubes. The values of resistors 81 and 82, and 83 and 84 are selected to correctly proportion the voltage of the generator 114 with the voltage across load resistors 47 and 51 in order that sufficient degeneration is effected by the derivative voltage to provide the desired stability.

Summarizing, the error signal of the transmission system controls the rotation of motor 71 according to the rate of movement of the control shaft 17. The motor 71 positions ball-carriage 97 of the integrating device whereby the cylinder 102 drives controlled shaft 28 synchronously with the control shaft 17.

Cylinder 102 of the variable-speed-drive 92 thus has an output corresponding to the integral of the rotation of the controlled motor 71. The shaft 14 is driven directly by the output of motor 71 and hence is proportional thereto. The permanent-magnet generator 114 supplies a voltage corresponding to the derivative of the output of motor 71 which is fed back into the control circuit. The remote control system described is thus provided with derivative, proportional, and integral stabilization controls.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A remote control system comprising a control member, a controlled member, means for producing signals proportional to the difference in position of said members, a motor controlled by said signals, an integrating device having an input actuated by said motor, a differential device jointly actuated by the motor and by the output of the integrating device for positioning the controlled member according to the position of the control member, and means controlled by the motor for producing a voltage proportional to the velocity of said motor for opposing the signals.

2. A remote control system comprising a control member, a controlled member, means for producing signals corresponding to the difference in the position of the members, a servo motor controlled by said means according to said signals, a variable speed device comprising a constant speed motor, a disc driven thereby, a drum, an adjustable ball carriage cooperating with the disc and drum positioned by the servo motor, a differential device controlled by the drum and the servo motor for positioning the controlled member according to the position of the control member, a member positioned according to angular rate by the servo motor, and a derivative device comprising a permanent magnet generator controlled by the servo motor for producing a degenerative feedback signal for modifying said signals.

3. A remote control system comprising a control member, a controlled member, means for producing signals corresponding to the difference in position of the members, a motor controlled by the signals, a variable speed drive, a speed regulating member therefor actuated by the motor, a differential having an output shaft effective to displace the controlled member, two input members for the differential actuated respectively by the motor and the output of the variable speed drive, and a generator driven by the motor for producing a potential proportional to the speed thereof for modifying the signals.

4. A control system comprising a remote control member, a local controlled member, local inductive means jointly controlled by the members for producing signals corresponding to the difference in position thereof, a differential amplifier controlled by the signals, a servo motor actuated by the output of the amplifier, a variable speed drive of the cylinder, disc and ball carriage type having a speed changing member actuated by the motor, and differential means actuated directly by the cylinder of the variable speed drive and by the motor for adjusting the position of the controlled member.

5. A control system comprising a remote control member, a local controlled member, local inductive means jointly controlled by the members for producing signals corresponding to the difference in position thereof, a differential amplifier controlled by the signals, a servo motor actuated by the output of the amplifier, generator means driven by the servo motor for producing a voltage proportional to the rate thereof for providing a degenerative feedback to the amplifier to modify the signals, a variable speed drive having a speed changing member actuated by the motor, and means jointly controlled by the output of the variable speed drive and the motor for adjusting the position of the controlled member.

6. In a remote control system, a controlled member, a control member remote therefrom, an inductive device local to the controlled member jointly controlled by both members for producing signals in accordance with the relative displacement of the members, a differential amplifier controlled by the signals, a servo motor controlled by the output of the amplifier, a variable speed drive of the cylinder, disc and movable ball carriage type having a speed changing member actuated by the motor, a differential having a pair of input members directly actuated respectively by the cylinder of the variable speed drive and the motor, an output for the differential for displacing the controlled member, an output shaft also displaced by the output of the differential, the displacement being proportional to the angular displacement of the control member, and a second output shaft coupled in fixed relation to the ball carriage, the displacement of the latter shaft being proportional to the angular rate of the control member.

WALTER T. WHITE.
HERBERT HARRIS, JR.

REFERENCES CITED

The following references are of record in the file of this patent:

UNITED STATES PATENTS

| Number | Name | Date |
| --- | --- | --- |
| 2,054,945 | Nisbet | Sept. 22, 1936 |
| 2,235,826 | Chafee | Mar. 25, 1941 |
| 2,248,072 | Fry | July 8, 1941 |

FOREIGN PATENTS

| Number | Country | Date |
| --- | --- | --- |
| 350,995 | Great Britain | June 11, 1931 |